United States Patent
Torno et al.

(10) Patent No.: US 6,226,576 B1
(45) Date of Patent: May 1, 2001

(54) METHOD FOR MONITORING AND ERROR RECOGNITION

(75) Inventors: Oskar Torno, Schwieberdingen; Carsten Kluth, Stuttgart; Werner Haeming, Neudenau; Iwan Surjadi, Vaihingen; Steffen Franke, Schwieberdingen; Michael Baeuerle, Markgroeningen, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/367,380

(22) PCT Filed: Nov. 27, 1998

(86) PCT No.: PCT/DE98/03492

§ 371 Date: Oct. 12, 1999

§ 102(e) Date: Oct. 12, 1999

(87) PCT Pub. No.: WO99/31476

PCT Pub. Date: Jun. 24, 1999

(30) Foreign Application Priority Data

Dec. 17, 1997 (DE) .......................... 197 56 081.4

(51) Int. Cl.[7] .......................... G01M 15/00; G01L 23/00
(52) U.S. Cl. .......................... 701/34; 73/116; 73/117.3; 73/118.1; 701/31
(58) Field of Search .......................... 73/35, 115, 116, 73/117.2, 117.3, 118.1; 701/29–35, 101, 110, 111

(56) References Cited

U.S. PATENT DOCUMENTS

| | | | |
|---|---|---|---|
| 4,418,567 | 12/1983 | Boening et al. | 123/425 |
| 4,462,362 | 7/1984 | Bonitz et al. | 123/425 |
| 4,521,769 | 6/1985 | Dudeck et al. | 73/35 |
| 4,593,553 | 6/1986 | Bonitz et al. | 123/425 |
| 4,821,194 | 4/1989 | Kawamura | 701/111 |
| 4,981,124 | 1/1991 | Sellner et al. | 123/425 |
| 5,088,044 | * 2/1992 | Matsuura | 701/111 |
| 5,414,645 | * 5/1995 | Hirano | 364/551.01 |
| 5,517,969 | 5/1996 | Unland et al. | 123/425 |
| 5,522,254 | 6/1996 | Kamabora et al. | 73/35.05 |
| 5,964,811 | * 10/1999 | Ishii et al. | 701/31 |

FOREIGN PATENT DOCUMENTS

720007 A1  7/1996  (EP) .
PCT/DE94/
01041  9/1994  (WO) .

* cited by examiner

Primary Examiner—George Dombroske
(74) Attorney, Agent, or Firm—Michael J. Striker

(57) ABSTRACT

A method for monitoring and error detection in a device for knock detection is disclosed, in which two different diagnosis functions can be carried out in an alternating fashion. If one of the diagnosis functions gives rise to the suspicion of an error or an error correction, this diagnosis function is carried out again in order to confirm the suspicion before the other diagnosis function is carried out, wherein the renewed diagnosis is carried out at a shorter interval than usual.

7 Claims, 2 Drawing Sheets

METHOD FOR MONITORING AND ERROR RECOGNITION

Figure 1:
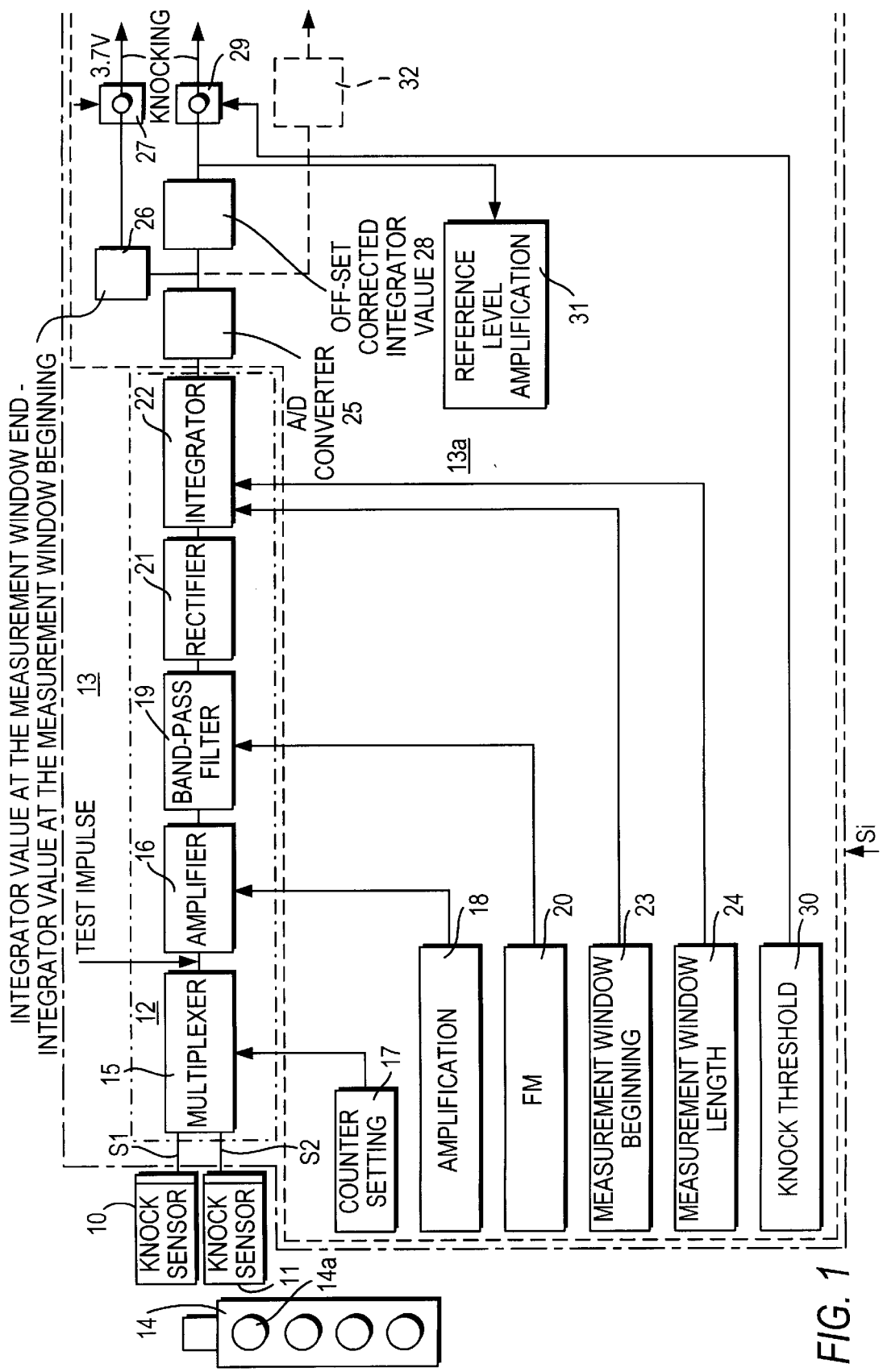

The invention relates to a process for monitoring and error detection, particularly in a device for head detection of an internal combustion engine, according to the preamble to the main claim.

1. Prior Art

It is known that in internal combustion engines with knock control, the knock sensor and the associated signal processing circuit have to be monitored with regard to their functional performance. Otherwise, there is the danger that in the event of a failure of the knock sensor or a defect in the associated evaluation circuit, knocking will not be detected and the operating point of the engine will be undesirably shifted into the knocking region, which can lead to the engine being endangered. In connection with devices for knock detection, methods for error detection are therefore proposed, which permit a reliable malfunction of the knock sensor or the evaluation circuit to be detected.

The International Patent Application PCT/DE 94/01041 has disclosed a method for error detection in a device for knock detection in an internal combustion engine, in which the output signals of the knock sensor are compared to a variable reference level, which is produced as a function of preceding output signals of the knock sensor. If the knock signals exceed a level that corresponds to the reference level multiplied by a cylinder-selective knock detection factor, knocking is detected. If the reference level, which is normalized so that it increases with the increasing noise of the engine, exceeds a permitted reference level band, then an error is detected. In order to increase the reliability of the error detection, an error indicator is only triggered when the reference level lies outside the reference level band for a period of time that can be predetermined.

2. Advantages of the Invention

The method for monitoring and error detection according to the invention, particularly in a device for knock detection in an internal combustion engine, has the advantage that an additional increase in the reliability of the error detection is achieved in comparison to embodiments that are known from the prior art. This advantage is attained by virtue of the fact that in a method for error detection with the features of claim 1, two different diagnosis functions are used and the two diagnosis functions are carried out in alternating fashion at fixed intervals. If one of the two diagnosis functions gives rise to the suspicion of an error, this diagnosis function is carried out an additional time or more often in order to verify the error message before the change-over to the other diagnosis function. If the error is confirmed, then an error is detected; if the error is not confirmed, then the process continues with the alternatingly executed diagnosis. The method is advantageously used analogously also when an error is cleared up. If an error that has been confirmed by a diagnosis is no longer occurring, this diagnosis is repeated at least once for confirmation before the error correction is acknowledged.

Other advantages of the invention are attained with the aid of the measures disclosed in the dependent claims. It is advantageous in this connection that the interval between the execution of the diagnosis functions can be determined as a time interval or, with the use in the control unit of an internal combustion engine, can also be determined as a number of combustions or work cycles. This permits an advantageous adaptation to various evaluation processes to be carried out. The two diagnosis functions contain separate debouncing counters for the sake of reliable error detection, with which the duration of the malfunction can also be taken into account in the error detection. If a diagnosis function has given rise to the suspicion of an error, the diagnoses are no longer carried out in alternating fashion, but rather the function that has produced the suspicion of an error is restarted and executed, wherein the interval, i.e. the time interval, the number of combustions, or the number of work cycles between two diagnoses can be reduced in comparison to the normal value. Therefore a rapid confirmation of the error suspicion or an elimination of the error suspicion can be produced in a particularly advantageous manner; this is particularly true when the interval becomes smaller. As soon as the error has been detected with certainty, or as soon as the error suspicion no longer exists, the normal state is re-activated and both diagnosis functions are executed in alternating fashion. This advantageously also applies for an error that has been detected but has been cleared up. A zero test and a test pulse are generated in a particularly advantageous manner as diagnosis functions, which in the normal state, are both alternatingly switched to the evaluation circuit.

The method for monitoring and error detection according to the invention can be used in a particularly advantageous manner in a device for knock detection in an internal combustion engine.

DRAWINGS

The invention is shown in the drawings and will be explained in detail in the subsequent description. In particular, FIG. 1 is a block circuit diagram of a knock evaluation circuit in which the method according to the invention is used.

Figure 2:
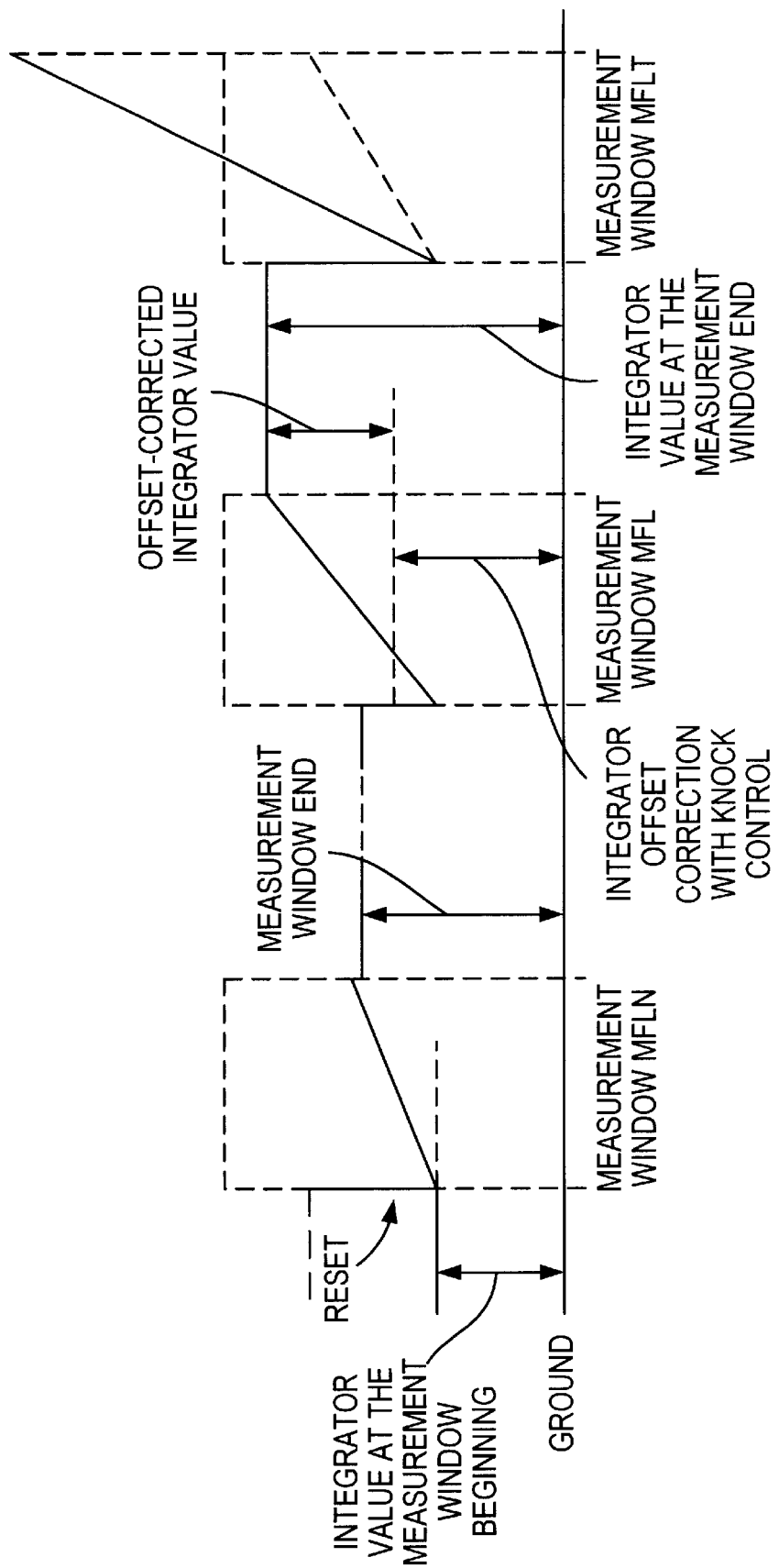

FIG. 2 shows a measurement value progression over time.

DESCRIPTION

In the exemplary embodiment depicted in FIG. 1, a device for knock detection in an internal combustion engine which has two knock sensors 10, 11 is shown, in which the error detection according to the invention is carried out. The knock sensors are connected to an evaluation circuit 12, which as an integrated circuit, is a component of the control unit 13 of the internal combustion engine. In a known manner, the control unit 13 includes at least one computer 13a, memory, triggering stages, etc. The control unit is supplied with signals Si or data which it requires for the calculations. The crankshaft angle signal and a temperature signal that are supplied by sensors are mentioned by way of example. The knock sensors 10 and 11 are disposed in the cylinders 14a of an internal combustion engine 14. They register the noise generated by the combustion events in the cylinders of the engine and send corresponding electrical signals S1, S2 to the evaluation circuit 12. The evaluation circuit 12 is embodied as an integrated circuit (IC) and is controlled by the computer 13a of the control unit 13. Different evaluation programs run on the computer 13a, which supply values or control signals that are required for the method according to the invention.

In particular, the evaluation circuit 12 includes a multiplexer 15 via which either the signal S1 of the knock sensor 10 or the signal S2 of the knock sensor 11 is transmitted to the amplifier 16. The selection of the transmitted signal is made by the control unit 13, wherein the switching of the multiplexer 15 by the control unit 13 takes place for example as a function of the counter setting KSA of the software cylinder counter 17. The amplifier 16 is a controllable amplifier whose amplification factor is set by the SG or as a function of the value VERST that is written in the block 18. The value VERST is determined in a knock detection program, not shown, that is running on the computer 13a.

The signal amplified in the amplifier 16 is filtered in a band-pass filter 19 whose center frequency can be adjusted. The adjustment of the center frequency of the band-pass filter 19 is carried out by the control unit in conjunction with the value FM that is determined in the computer 13a and stored in the block 20, whose calculation does not have to be discussed in detail at this point.

In the rectifier 21, the signal supplied by the band-pass filter 19 is rectified and in the subsequent integrator 22, it is integrated in a measurement window that can be predetermined. The beginning of the measurement window and the end of the measurement window are determined by the values contained in the blocks 23 and 24. These values (program maps) for the measurement window beginning MFWWI and the measurement window length MFLWI are likewise taken into account in the knock detection program.

The output signal of the evaluation circuit 12 is digitized in an analog/digital converter 25, which is a component of the computer 26 of the control unit. The difference between the integrator value at the measurement window end INMFE and the integrator value at the measurement window beginning INMFA is produced in the block 26. This difference is compared in block 27 with a threshold value, for example a voltage of 3.7 V, and if the difference is greater than this threshold value, knocking is detected and the condition KLOPFEN [knocking] is output.

The previously offset-corrected integrator value INOFFKOR is set in relation to a maximal value REFPEGMX in the block 28. The result is compared in the block 29 with the value KLSCHW that is obtained from the knock detection. If the comparison result is greater than zero, then knocking is likewise detected and the conditions KLOPFEN [knocking] is output. The output of the block 28 is simultaneously used as a basis for the reference level calculation carried out in the block 31 for the next knock detection of this cylinder. The reference level REFPEG is thus determined as a function of the output of the block 28; in addition, the amplification factor VERST is also determined.

The overall control of the evaluation circuit 12, i.e. the switching over of the multiplexer 15 as well as the determination of the individual cylinder input amplification in the amplifier 16, the starting and stopping of the integrator 22, and the selection of the filter center frequency of the band-pass filter 19 as well as the signal processing, which is not described in detail, are realized by means of a knock detection function contained in the computer of the control unit 13. The signal processing is essentially comprised of an offset correction of the final integrator values. The knock detection itself and therefore the calculation of the values REFPEG, VERST, KLSCHW, and KLOPFEN is not described in detail. Both the knock detection and the calculation of the factors mentioned above takes place in the computer 13a of the control unit 13, which also carries out the monitoring and error detection.

The knock detection circuit with monitoring and error detection that is shown in FIG. 1 functions in the following manner: with each combustion, the computer 13a of the control unit 13 reads in the integrator value IW that is present at the output of the integrator 22 by way of the analog/digital converter 25 and calculates the offset-corrected integrator value INOFFKOR relevant to the knock determination through the use of the following equations:

$$INOFFKOR=INMFE-INKOR$$

wherein the following is true:

$$INKOR=INMFA+(INTST*MFLN)$$

with

| | |
|---|---|
| INMFA | integrator value with knock control at the measurement window beginning, |
| INMFENT | integrator value with knock control at the measurement window end with zero test, |
| INKOR | integrator offset correction with knock control, |
| INOFFKOR | offset-corrected integrator value, |
| INMFE | integrator value with knock regulation at the measurement window end |

These integrator values are continuously determined by the computer 13a of the control unit 13 and are taken into account in knock detection.

In addition to the knock detection, the computer 13a of the control unit 13 also carries out the method for monitoring and error detection according to the invention, which is described below. It is essential that two different diagnosis functions or test functions occur wherein one of the test functions is called a zero test and the other is called a test pulse. The integrator values that have occurred under the given conditions are evaluated with both test functions. These integrator values are plotted in FIG. 2 as voltages over ground as a function of the crankshaft angle.

The two diagnosis functions zero test and test pulse are triggered alternatingly in the normal case, i.e. when neither an error nor and error correction has been detected, wherein an interval of 255 work cycles between the diagnosis functions has turned out to be suitable. If neither of the two diagnosis functions is active, the regular knock detection is running. Both the regular knock detection and the two test functions are carried out within a measurement window that is a function of the crankshaft angle. The beginning and the length of the measurement window are determined by the computer 13a of the control unit 13, which evaluates the output signal of a crankshaft angle sensor for this purpose.

In order to carry out the zero test function, both knock sensors are disconnected, i.e. the amplifier 16 is not supplied with an output signal of a knock sensor. When the measurement window MFLN provided for the zero test is reached, a reset is triggered. Then a voltage is adjusted in the integrator 22, which is labeled INMFA. This voltage at the measurement window beginning increases during the measurement window MFLN and achieves a value INMFEN at the end of the measurement window. This increase of the integrator voltage is achieved by means of existing offset voltages. If the difference between the voltage at the measurement window end INMFEN and the voltage at the measurement window beginning INMFA is produced, the production of the difference takes place in block 27, then a measure can be obtained that is used for error detection in the zero test.

The difference INMFEN–INMFA is supplied to a comparator 32, which detects and error when the difference deviates from a value that can be predetermined. The comparator 32 is otherwise designed so that it can also execute other comparisons that are explained later.

Upon execution of the test pulse function, a test pulse is introduced after the multiplexer 15. This test pulse is generated by the control unit, for example by means of switching on a voltage source. The influence of the test pulse on the subsequent evaluation circuit is evaluated for the error detection.

After the introduction of the test pulse, the content of the integrator 22 increases significantly more rapidly during normal operation than in a regular knock detection. FIG. 2 shows how the integrator content changes in the regular knock detection in the measurement window MFL and how it changes in the measurement window MFLT. In the regular knock detection, a reset takes place at the beginning of the measurement window MFL. During the measurement window, the integrator voltage increases to a value INMFE. This value is comprised of the voltages INKOR and INOFFKOR. The integrator value at the end of the measurement window MFL is finally a measure for whether knocking has occurred or not.

If a test pulse is introduced at the beginning of the measurement window MFLT after the reset, then the voltage at which the integrator 22 charges increases to a value that is markedly increased in comparison to the value INMFE. The comparison of the integrator voltage at the end of the measurement window DMFLT with a value that can be predetermined, which can be adapted if need be to a voltage level that can be achieved in regular knock detection, permits an error to be detected if the comparison result does not correspond to the expected value.

With the test pulse diagnosis in particular, the comparison of the voltage increase in the measurement window MFLT with the voltage increase in the measurement window MFL can be used for error detection. If this voltage increase does not fulfill a condition that can be predetermined, an error is detected.

After the execution of one of the two diagnoses zero test or test pulse, if the suspicion of an error is generated in one of these diagnoses or, in the event of an error that has been previously detected with certainty, if an error correction is suspected, the two diagnoses zero test and test pulse are no longer carried out in alternating fashion, but rather the test that has generated the error suspicion or the test that has given rise to the suspicion of an error correction is repeated once more until the error detection has been confirmed or the error correction is verified. The repetition of the diagnosis function that gives rise to the suspicion of an error detection or error correction, can be repeated even earlier than usual in one embodiment, for example after 120 work cycles. This assures that the error detection based on the suspicion of an error or the error correction based on the suspected error correction can occur rapidly.

If an error suspicion is confirmed in the repeated diagnosis function, the error suspicion is converted into a definitively detected error. Then the execution of the diagnosis functions can once again occur in an alternating fashion until a suspicion of error correction occurs.

The invention has been described in conjunction with a device for knock detection using diagnosis; for example, it can be employed in a knock detection IC currently in use, which has the name CC195. The principle of the method for monitoring and error detection using two different diagnosis functions, which normally run in an alternating fashion and are only repeated for the sake of certainty when there is the suspicion of an error or the suspicion of an error correction, can be generally used in all processes in which a monitoring or error detection is required.

What is claimed is:

1. A method for monitoring and error detection in particular in a device for knock detection, with a diagnosis function that is carried out at least temporarily, characterized in that in addition, another diagnosis function is carried out and both diagnosis functions are carried out in an alternating fashion at fixed intervals, and that in the event of a suspected error detection or a suspected error correction, the diagnosis function that gives rise to the suspicion of an error is carried out at least one additional time for the sake of assurance before the other diagnosis function is carried out.

2. The method for monitoring and error detection according to claim 1, characterized in that one diagnosis function includes a zero test and the other diagnosis function is carried out by means of a test pulse that can be introduced, wherein both diagnosis functions are triggered by means of corresponding triggers in the associated evaluation circuit.

3. The method for monitoring and error detection according to claim 1, characterized in that it takes place in a computing device of a control unit belonging to an internal combustion engine and is used in connection with the evaluation of sensor signals of the internal combustion engine.

4. The method for monitoring and error detection according to claim 1, characterized in that the interval between two subsequent diagnosis functions is a time period or a number, in particular a number of combustions or work cycles.

5. The method for monitoring and error detection according to claim 1, characterized in that an error is only detected when the debouncing counter which is associated with the accompanying diagnosis function, has a counter setting that can be predetermined.

6. The method for monitoring and error detection according to claim 1, characterized in that in the event that the error suspicion is not confirmed or after an error correction is detected, a change-over into the normal sequence of diagnosis functions is carried out.

7. The method for monitoring and error detection according to claim 1, characterized in that in the event of a suspected error detection, the same diagnosis is carried out at a different interval, in particular a shorter interval.

* * * * *